(12) United States Patent
Berkland et al.

(10) Patent No.: US 8,180,847 B2
(45) Date of Patent: *May 15, 2012

(54) FLEXIBLE WEB SERVICE DEPLOYMENT

(75) Inventors: Philip Theodore Berkland, Austin, TX (US); Bryce Allen Curtis, Round Rock, TX (US); Gregory Alan Flurry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

This patent is subject to a terminal disclaimer.

(21) Appl. No.: 11/548,478

(22) Filed: Oct. 11, 2006

(65) Prior Publication Data

US 2007/0124423 A1 May 31, 2007

Related U.S. Application Data

(63) Continuation of application No. 10/322,051, filed on Dec. 17, 2002, now Pat. No. 7,284,039.

(51) Int. Cl.
*G06F 15/16* (2006.01)
*G06F 9/46* (2006.01)

(52) U.S. Cl. .......................... 709/217; 719/330

(58) Field of Classification Search ................. 709/219, 709/328, 203, 220, 217; 719/315, 330; 717/120; 715/234

See application file for complete search history.

(56) References Cited

U.S. PATENT DOCUMENTS

| | | | |
|---|---|---|---|
| 6,476,833 B1 | 11/2002 | Moshfeghi | |
| 6,581,094 B1 | 6/2003 | Gao | |
| 6,697,849 B1 | 2/2004 | Carlson | |
| 6,748,569 B1 | 6/2004 | Brooke et al. | |
| 7,017,149 B2 | 3/2006 | Hanis | |
| 7,080,350 B2 | 7/2006 | Saimi et al. | |
| 7,159,224 B2 | 1/2007 | Sharma et al. | |
| 7,162,687 B2 | 1/2007 | Pelegri-Llopart et al. | |
| 7,181,442 B2 | 2/2007 | Yeh et al. | |
| 7,188,155 B2 | 3/2007 | Flurry et al. | |
| 7,246,358 B2 | 7/2007 | Chinnici et al. | |
| 7,254,614 B2 | 8/2007 | Mulligan et al. | |
| 7,284,039 B2 * | 10/2007 | Berkland et al. | 709/219 |
| 7,386,860 B2 * | 6/2008 | Dani et al. | 719/315 |
| 7,392,298 B2 | 6/2008 | Berkland et al. | |
| 7,475,145 B2 | 1/2009 | Blizniak et al. | |
| 7,496,637 B2 | 2/2009 | Han et al. | |
| 7,587,447 B2 * | 9/2009 | Ryman | 709/203 |
| 7,739,658 B2 | 6/2010 | Watson et al. | |

(Continued)

OTHER PUBLICATIONS http://www-3.ibm.com/software/ad/studioappdev/, WebSphere Studio Application Developer—Product Overview—IBM Software, Nov. 19, 2002, pp. 1-2.

(Continued)

*Primary Examiner* — Jungwon Chang
(74) *Attorney, Agent, or Firm* — Yee & Associates, P.C.; Jeffrey S. LaBaw

(57) ABSTRACT

An apparatus and method for deploying web services in a web services infrastructure are provided. With the apparatus and method, a deployment descriptor for a web service is retrieved from a configuration file. A location type in the deployment descriptor is provided for identifying whether the web service is implemented using a web services description language (WSDL) document only, a JavaBean only, or both a WSDL document and a JavaBean. Based on the location type, and associated attributes of the location type, processes are performed for generating an internal definition of the web service to thereby deploy the web service in the web services infrastructure.

15 Claims, 16 Drawing Sheets

U.S. PATENT DOCUMENTS

| | | | |
|---|---|---|---|
| 2001/0047402 | A1 | 11/2001 | Saimi et al. |
| 2002/0143819 | A1 | 10/2002 | Han et al. |
| 2003/0033369 | A1* | 2/2003 | Bernhard ............... 709/203 |
| 2003/0093500 | A1 | 5/2003 | Khodabakchian et al. |
| 2003/0095540 | A1 | 5/2003 | Mulligan et al. |
| 2003/0133554 | A1 | 7/2003 | Nykanen et al. |
| 2003/0158918 | A1* | 8/2003 | Hanis ............... 709/220 |
| 2003/0182651 | A1* | 9/2003 | Secrist et al. ............... 717/120 |
| 2003/0204622 | A1 | 10/2003 | Blizniak et al. |
| 2003/0204645 | A1* | 10/2003 | Sharma et al. ............... 709/328 |
| 2003/0226107 | A1 | 12/2003 | Pelegri-Liopart et al. |
| 2004/0006651 | A1 | 1/2004 | Dani et al. |
| 2004/0024841 | A1 | 2/2004 | Becker et al. |
| 2004/0049574 | A1 | 3/2004 | Watson et al. |
| 2004/0054690 | A1 | 3/2004 | Hillerbrand et al. |
| 2004/0059722 | A1 | 3/2004 | Yeh et al. |
| 2004/0093580 | A1 | 5/2004 | Carson et al. |
| 2004/0111525 | A1 | 6/2004 | Berkland et al. |
| 2004/0117425 | A1 | 6/2004 | Berkland et al. |
| 2004/0139151 | A1 | 7/2004 | Flurry et al. |
| 2004/0205473 | A1 | 10/2004 | Fisher et al. |
| 2006/0053087 | A1 | 3/2006 | Pavlov |

OTHER PUBLICATIONS http://www-124.ibm.com/developerworks/projects/wsdl4j/, "IBM developerWorks: Open Sourceprojects—WSDL4J Project: Summary", Nov. 19, 2002, pp. 1.

http://www.systinet.com/dock/wasp_jserver/tools/java2WSDL.html, "Chapter 4. Java2WSDL", Nov. 19, 2002, pp. 1-14.

Wolter, "Overview of SOAP Client in Windows XP", Microsoft Corporation, May 2001, pp. 1-10.

Ogbuji, "Using WSDL in SOAP applications", IBM Nov. 1, 2000, pp. 1-7.

Pallos, "Service-Oriented Architecture: A Primer", EAI Journal, Dec. 2001, pp. 32-35.

Tapang, "Web Services Description Language (WSDL) Explained", MSDN, Jul. 2001, pp. 1-17.

"Web Services White Paper", Sonera Plaza Ltd MediaLab, Jun. 12, 2002, pp. 1-10.

"Service Oriented Architecture", White Paper, Adobe, 2005, pp. 1-10.

Diaz et al., "Web Services for Remote Portals (WSRP)", Internet Article, Jan. 21, 2002, http://www-106.ibm.com/developerworks/webservices/library/ws-wsrp/, Mar. 23, 2004, pp. 1-26.

Goodman, "Accelerate your Web Services with Caching", Internet Article, Dec. 1, 2002, ftp://www6.software.ibm.com/software/developer/library/ws-cach1.pdf, Mar. 23, 2004, pp. 1-7.

Fremantle, "Applying the Web Services Invocation Framework", Internet Article, Jun. 2002, ftp://www6.software.ibm.com/software/developer/library/ws-appwsif.pdf, Mar. 23, 2004, pp. 1-7.

IBM Research Disclosure Bulletin, "Method of Enabling Automated Invocation of Web Services", vol. 455, No. 132, Mar. 2002, pp. 1-6.

Web Service Description Language (WSDL) 1.1, Mar. 2001 (W3C).

USPTO Office Action regarding U.S. Appl. No. 10/314,813, dated Jun. 26, 2006.

USPTO Examiner's Interview Summary regarding U.S. Appl. No. 10/314,813, dated Aug. 8, 2006.

USPTO Final Office Action regarding U.S. Appl. No. 10/314,813, dated Oct. 17, 2006.

USPTO Appeal Brief regarding U.S. Appl. No. 10/314,813, dated Mar. 13, 2007.

USPTO Examiner's Answer regarding U.S. Appl. No. 10/314,813, dated Jun. 13, 2007.

USPTO Reply Brief regarding U.S. Appl. No. 10/314,813, dated Aug. 13, 2007.

USPTO Decision on Appeal regarding U.S. Appl. No. 10/314,813, dated Jan. 26, 2010.

USPTO Office Action regarding U.S. Appl. No. 10/322,051, dated Jul. 5, 2006.

USPTO Office Action regarding U.S. Appl. No. 10/322,051, dated Jul. 13, 2006.

USPTO Examiner's Interview Summary regarding U.S. Appl. No. 10/322,051, dated Aug. 21, 2006.

USPTO Response to Office Action regarding U.S. Appl. No. 10/322,051, dated Aug. 29, 2006.

USPTO Office Action regarding U.S. Appl. No. 10/322,051, dated Nov. 17, 2006.

USPTO Response to Office Action regarding U.S. Appl. No. 10/322,051, dated Feb. 13, 2007.

USPTO Final Office Action regarding U.S. Appl. No. 10/322,051, dated Mar. 22, 2007.

USPTO Response to Final Office Action regarding U.S. Appl. No. 10/322,051, dated Apr. 27, 2007.

USPTO Notice of Allowance regarding U.S. Appl. No. 10/322,051, dated Jun. 8, 2007.

USPTO Office Action regarding U.S. Appl. No. 10/322,053, dated May 17, 2006.

USPTO Notice of Allowance regarding U.S. Appl. No. 10/322,053, dated Oct. 27, 2006.

USPTO Office Action regarding U.S. Appl. No. 11/761,445, dated Nov. 27, 2007.

USPTO Response to Office Action regarding U.S. Appl. No. 11/761,445, dated Feb. 27, 2008.

USPTO Notice of Allowance regarding U.S. Appl. No. 11/761,445, dated Apr. 9, 2008.

* cited by examiner

```
<busInfo...>
  <busServices>
    <busService serviceName="WSDLService"...>
      ...
510 ~ <targetServices>                                              532
      <targetService location Type="URL" ／530                       ╱
                    location="http://localhost:80/wsbus/wsdl/StockQuoteService.wsdl".../>
      </targetServices>                                      \
    </busService>                                            520
    <busService serviceName="BeanService"...>
      ...
      <targetServices>
         <targetService location Type="bean" ／540
                       serviceNamespace="http://wsbus/default/" className="StockQuoteService"/>
      </targetServices>                                                                  \
    <busService serviceName="BothService"...>                                            542
      ...
      <targetServices>
         <targetService location Type="both" ／550
            location="http://localhost:80/wsbus/wsdl/OldStockService.wsdl" ~ 552
            className="StockQuoteService"/>
      </targetServices>
    </busService>
  </busServices>
</busInfo>
```

*FIG. 5*

```
AddressBook bean
package demo ;
public class AddressBook {
        public void addEntry(String name, Address address) {}
        public Address getAddressFromName (String name) {}
        public String removeEntry(String name) {}
}
```

*FIG. 10*

```
Address bean
package demo;
public class Address {
        private int streetNum;
        private String streetName;
        private String city;
        private String state;
        private int zip;
        private PhoneNumber phoneNumber;

public void set<fieldName>(<fieldvalue>) {}
        public <fieldType> get<fieldName>() {}
}
```

*FIG. 11A*

```
PhoneNumber bean
package demo;
public class PhoneNumber {
        private int areaCode;
        private String exchange;
        private String number;

public void set<fieldName>(<fieldvalue>) {}
        public <fieldType> get<fieldName>() {}
}
```

*FIG. 11B*

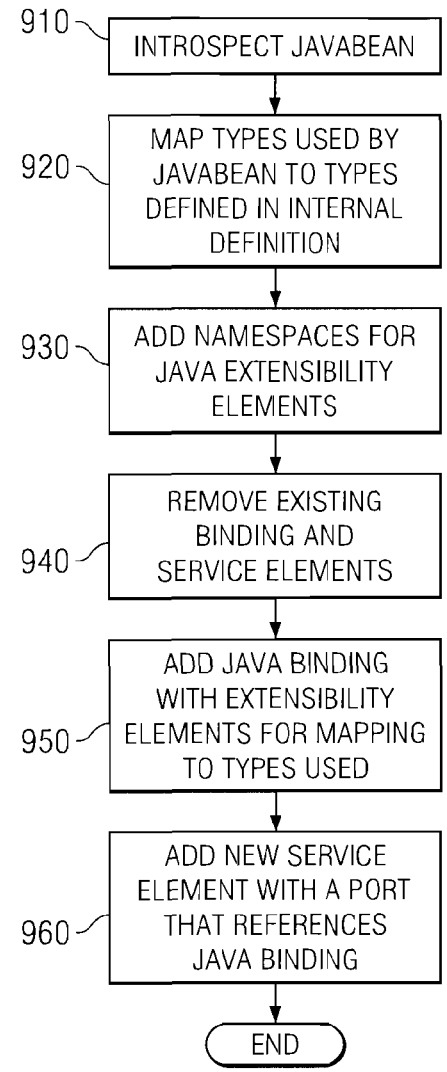

*FIG. 9*

WSDL generated from AddressBook
(with SOAP/HTTP binding)

```xml
<?xml version="1.0" encoding ="UTF-8"?>
<wsdl:definitions targetNamespace="http://wsbus/default/"
    xmlns="http://schemas.xmlsoap.org/wsdl/"
    xmlns:apachesoap="http://xml.apache.org/xml-soap"
    xmlns:impl= "http://wsbus/default/"
    xmlns:intf="http://wsbus/default/"
    xmlns:soapenc="http://schemas.xmlsoap.org/soap/encoding/"
    xmlns:tns1="http://demo"
    xmlns:wsdl="http://schemas.xmlsoap.org/wsdl/"
    xmlns:wsdlsoap="http://schemas.xmlsoap.org/wsdl/soap/"xmlns.xsd="http://www.w3.org/2001/XMLschema">
    <wsdl:types>
        <schema targetNamespace="http://demo "xmlns="http://www.w3.org/2001/XMLSchema">
            <import namespace="http://schemas.xmlsoap.org/soap/encoding/"/>
            <complexType name="Address">
                <sequence>
                    <element name="streetNum" type="xsd:int"/>
                    <element name="streetName" nillable="true" type="soapenc:string"/>
                    <element name="city" nillable="true" type="soapenc:string"/>
                    <element name="state" nillable="true" type ="soapenc:string"/>
                    <element name="zip" type="xsd:int"/>
                    <element name="phoneNumber" nillable="true" type="tns1:PhoneNumber"/>
                </sequence>
            </complexType>
            <complexType name="PhoneNumber">
                <sequence>
                    <element name="areaCode" type="xsd:int"/>
                    <element name="exchange" nillable="true" type="soapenc:string"/>
                    <element name="number" nillable="true" type="soapenc:string"/>
                </sequence>
            </complexType>
            <element name "Address" nillable= "true" type="tns1:Address"/>
        </schema>
    </wsdl:types>
    <wsdl:message name ="removeEntryResponse">
        <wsdl:part name="return" type="soapenc:string"/>
    </wsdl:message>
    <wsdl:message name="getAddressFromNameRequest">
        <wsdl:part name="name" type="soapenc:string"/>
    </wsdl:message>
    <wsdl:message name="addEntryRequest">
        <wsdl:part name="name" type="soapenc:string"/>
        <wsdl:part name="address" type="tns1:Address"/>
    </wsdl:message>
    <wsdl:message name="addEntryResponse"/>
    <wsdl:message name="removeEntryRequest">
        <wsdl:part name="name" type="soapenc:string"/>
    </wsdl:message>
    <wsdl:message name="getAddressFromNameResponse">
```

*FIG. 12A*

```xml
            <wsdl:part name="return" type="tns1:Address"/>
        </wsdl:message>
<wsdl:portType name="AddressBook">
        <wsdl:operation name="removeEntry" parameterOrder="name">
                <wsdl:input message="impl:removeEntryRequest" name="removeEntryRequest"/>
                <wsdl:output message="impl:removeEntryResponse" name="removeEntryResponse"/>
        </wsdl:operation>
        <wsdl:operation name="getAddressFromName" parameterOrder="name">
                <wsdl:input message="impl:getAddressFromNameRequest" name="getAddressFromNameRequest"/>
                <wsdl:output message="impl:getAddressFromNameResponse" name="getAddressFromNameReponse"/>
        </wsdl:operation>
        <wsdl:operation name="addEntry" parameterOrder="name address">
                <wsdl:input message="impl:addEntryRequest" name="addEntryRequest"/>
                <wsdl:output message="impl:addEntryResponse" name="addEntryResponse"/>
        </wsdl:operation>
</wsdl:portType>
<wsdl:binding name="mushSoapBinding" type="impl:AddressBook">
        <wsdlsoap:binding style="rpc" transport="http://schemas.xmlsoap.org/soap/http"/>
        <wsdl:operation name="removeEntry">
                <wsdlsoap:operation soapAction=""/>
                <wsdl:input name="removeEntryRequest">
                    <wsdlsoap:body
                        encodingStyle="http://schemas.xmlsoap.org/soap/encoding/"
                        namespace="http://wsbus/default/" use="encoded"/>
                </wsdl:input>
                <wsdl:output name="removeEntryResponse">
                    <wsdlsoap:body
                        encodingStyle="http://schemas.xmlsoap.org/soap/encoding/"
                        namespace="http://wsbus/default/" use="encoded"/>
                </wsdl:output>
        </wsdl:operation>

<wsdl:operation name="getAddressFromName">
            <wsdlsoap:operation soapAction=""/>
            <wsdl:input name="getAddressFromNameRequest">
                <wsdlsoap:body
                    encodingStyle="http://schemas.xmlsoap.org/soap/encoding/"
                    namespace="http://wsbus/default/" use="encoded"/>
            </wsdl:input>
            <wsdl:output name="getAddressFromNameResponse">
                <wsdlsoap:body
                    encodingStyle="http://schemas.xmlsoap.org/soap/encoding/"
                    namespace="http://wsbus/default/" use="encoded"/>
            </wsdl:output>
    </wsdl:operation>
    <wsdl:operation name="addEntry">
        <wsdlsoap:operation soapAction=""/>
        <wsdl:input name="addEntryRequest">
```

FIG. 12B

```
            <wsdlsoap:body
                    encodingStyle="http://schemas.xmlsoap.org/soap/encoding/"
                    namespace="http://wsbus/default/" use="encoded"/>
        <wsdl:input>
        <wsdl:output name="addEntryResponse">
            <wsdlsoap:body
                    encodingStyle="http://schemas.xmlsoap.org/soap/encoding/"
                    namespace="http://wsbus/default/" use="encoded"/>
        </wsdl:output>
    </wsdl:operation>
  </wsdl: binding>
  <wsdl:service name="AddressBookService">
    <wsdl:port binding="impl:mushSoapBinding" name="mush">
        <wsdlsoap:address location="http://localhost:8080/wstk/mush"/>
    </wsdl:port>
  </wsdl:service>
</wsdl:definitions>
```

*FIG. 12C*

```
<?xml version="1.0" encoding= "UTF-8"?>
<wsdl:definitions targetNamespace="http://wsbus/default/"
    xmlns="http://schemas.xmlsoap.org/wsdl/"
    xmlns:apachesoap="http://xml.apache.org/xml-soap"
    xmlns:format="http://schemas.xmlsoap.org/wsdl/formatbinding/"
    xmlns:impl="http://wsbus/default/"
    xmlns:intf="http://wsbus/default/"
    xmlns:java="http://schemas.xmlsoap.org/wsdl/java/"
    xmlns:soapenc="http://schemas.xmlsoap.org/soap/encoding/"
    xmlns:tns1="http://demo"
    xmlns:wsdl="http://schemas.xmlsoap.org/wsdl/"
    xmlns:wsdlsoap="http://schemas.xmlsoap.org/wsdl/soap/" xmlns:xsd="http://www.w3.org/2001/XMLSchema"
    <wsdl:types>
        <schema targetNamespace="http://demo" xmlns="http://www.w3.org/2001/XMLSchema">
            <import namespace="http://schemas.xmlsoap.org/soap/encoding/"/>
            <complexType name"Address">
                <sequence>
                    <element name="streetNum" type="xsd:int"/>
                    <element name="streetName" nillable="true" type="soapenc:string"/>
                    <element name="city" nillable="true" type="soapenc:string"/>
                    <element name="state" nillable="true" type="soapenc:string"/>
                    <element name="zip" type="xsd:int"/>
                    <element name="phoneNumber" nillable="true" type="tns1:PhoneNumber"/>
                </sequence>
            </complexType>
            <complexType name="PhoneNumber">
```

*FIG. 13A*

```xml
        <sequence>
            <element name="areaCode" type="xsd:int"/>
            <element name="exchange" nillable="true" type="soapenc:string"/>
            <element name="number" nillable="true" type="soapenc:string"/>
        </sequence>
      </complexType>
      <element name="Address" nillable="true" type="tns1:Address"/>
    </schema>
</wsdl:types>
<wsdl:message name="removeEntryResponse">
    <wsdl:part name="return" type="soapenc:string"/>
</wsdl:message>
<wsdl:message name="getAddressFromNameRequest">
    <wsdl:part name="name" type="soapenc:string"/>
</wsdl:message>
<wsdl:message name="addEntryRequest">
    <wsdl:part name="name" type="soapenc:string"/>
    <wsdl:part name="address" type="tns1:Address"/>
</wsdl:message>
<wsdl:message name="addEntryResponse"/>
<wsdl:message name="removeEntry Request">
    <wsdl:part name="name" type="soapenc:string"/>
</wsdl:message>
<wsdl:message name="getAddressFromNameResponse">
    <wsdl:part name="return" type="tns1:Address"/>
</wsdl:message>
<wsdl:portType name="AddressBook">
    <wsdl:operation name="removeEntry" parameterOrder="name">
        <wsdl:input message="impl:removeEntryRequest" name="removeEntryRequest"/>
        <wsdl:output message="impl:removeEntryResponse" name="removeEntryResponse"/>
    </wsdl:operation>
    <wsdl:operation name="getAddressFromName" parameterOrder="name">
        <wsdl:input message="impl:getAddressFromNameRequest" name="getAddressFromNameRequest"/>
        <wsdl:output message="impl:getAddressFromNameResponse" name="getAddressFromNameResponse"/
    </wsdl:operation>
    <wsdl:operation name="addEntry" parameterOrder="name address">
        <wsdl:input message="impl:addEntryRequest" name="addEntryRequest"/>
        <wsdl:output message="impl:addEntryResponse" name="addEntryResponse"/>
    </wsdl:operation>
</wsdl:portType>
<wsdl:binding name="JavaBinding" type="impl:AddressBook">
    <java:binding/>
    <format:typeMapping encoding="Java" style="Java">
        <format:typeMap formatType="demo.Address" typeName="tns1:Address"/>
        <format:typeMap formatType="int" typeName="xsd:int"/>
        <format:typeMap formatType="demo.PhoneNumber" typeName="tns1:PhoneNumber"/>
        <format:typeMap formatType="java.lang.String" typeName="soapenc:string"/>
    </format:typeMapping>
```

*FIG. 13B*

```
            <wsdl:operation name="removeEntry">
                <java:operation methodName="removeEntry" methodType="instance"/>
                <wsdl:input name="removeEntryRequest"/>
                <wsdl:output name="removeEntryResponse"/>
            </wsdl:operation>
            <wsdl:operation name="getAddressFromName">
                <java:operation methodName="getAddressFromName" methodType="instance"/>
                <wsdl:input name="getAddressFromNameRequest"/>
                <wsdl:output name="getAddressFromNameResponse"/>
            </wsdl:operation>
            <wsdl:operation name="addEntry">
                <java:operation methodName="addEntry" methodType="instance"/>
                <wsdl:input name="addEntryRequest"/>
                <wsdl:output name="addEntryResponse"/>
            </wsdl:operation>
        </wsdl:binding>
        <wsdl:service name="AddressBookService">
            <wsdl:port binding="impl:JavaBinding" name="JavaPort">
                <java:address className="demo.AddressBook"/>
            </wsdl:port>
        </wsdl:service>
</wsdl:definitions>
```

*FIG. 13C*

Original WSDL for AddressBook

```
<?xml version="1.0" encoding="UTF-8"?>
<definitions xmlns="http://schemas.xmlsoap.org/wsdl/"
        xmlns:interface="http://tempuri.org/AddressBookService-interface"
        xmlns:soap="http://schemas.xmlsoap.org/wsdl/soap/"
        xmlns:tns="http://tempuri.org/AddressBookService"
        xmlns:xsd="http://www.w3.org/2001/XMLSchema"
        name="SimpleAddressBookService"
        targetNamespace="http://tempuri.org/AddressBookService"
        xmlns:types="http://tempuri.org/AddressBookService-types"
        xmlns:AddressBook="http://tempuri.org/AddressBookService-types">
    <types>
        <schema xmlns="http://www.w3.org/2001/XMLSchema"
                targetNamespace="http://tempuri.org/AddressBookService-types"
                xmlns:AddressBook="http://tempuri.org/AddressBookService-types">
            <complexType name="AddressType">
                <sequence minOccurs="1" maxOccurs="1">
                    <element name="streetNum" type="xsd:int" minOccurs="1" maxOccurs="1"/>
                    <element name="streetName" type="xsd:string" minOccurs="1" maxOccurs="1"/>
                    <element name="city" type="xsd:string" minOccurs="1" maxOccurs="1"/>
                    <element name="state" type"xsd:string" minOccurs="1" maxOccurs"1"/>
```

*FIG. 14A*

```xml
                    <element name="zip" type="xsd:int" minOccurs="1" maxOccurs="1"/>
                    <element name="phoneNumber" type="AddressBook:phoneNumberType" minOccurs="1" maxOccurs="1"/>
                </sequence>
            </complexType>
            <complexType name="phoneNumberType">
                <sequence minOccurs="1" maxoccurs="1">
                    <element name="areaCode" type="xsd:int" minOccurs="1" maxOccurs="1"/>
                    <element name="exchange" type="xsd:string" minOccurs="1" maxOccurs"1"/>
                    <element name="number" type="xsd:string" minOccurs="1" maxOccurs="1"/>
                </sequence>
            </complexType>
        </schema>
    </types>
    <message name="InaddEntryRequest">
        <part name="meth1_inType1" type="xsd:string"/>
        <part name="meth1_inType2" type="types:AddressType"/>
    </message>
    <message name="voidResponse"/>
    <message name=IngetAddressFromNameRequest">
        <part name="meth2_inType1" type="xsd:string"/>
    </message>
    <message name="OutgetAddressFromNameResponse">
        <part name="getAddressFromNameResult" type="types:AddressType"/>
    </message>
     <message name="InremoveEntryRequest">
        <part name="meth1_inType1" type="xsd:string"/>
    </message>
    <message name="OutremoveEntryResponse">
        <part name="removeEntryResult" type="xsd:string"/>
    </message>
    <portType name="AddressBook_Service">
            <operation name="addEntry">
                <input message="tns:InaddEntryRequest"/>
                <output message="tns:voidResponse"/>
            </operation>
            <operation name="getAddressFromName">
                <input message="tns:IngetAddressFromNameRequest"/>
                <output message="tns:OutgetAddressFromNameResponse"/>
            </operation>
            <operation name="removeEntry">
                <input message="tns:InremoveEntryRequest"/>
                <output message="tns:OutremoveEntryResponse"/>
            </operation>
        </portType>
       <binding name="AddressBook_ServiceBinding" type="tns:AddressBook_Service">
           <soap:binding style="rpc" transport="http://schemas.xmlsoap.org/soap/http"/>
           <operation name="addEntry>
```

*FIG. 14B*

```xml
            <soap:operation soapAction="http://tempuri.org/AddressBookService"/>
            <input>
                <soap:body encodingStyle="http://schemas.xmlsoap.org/soap/encoding/"
                    namespace="http://tempuri.org/AddressBookService" use="encoded"/>
            </input>
            <output>
                <soap:body encodingStyle="http://schemas.xmlsoap.org/soap/encoding/"
                    namespace="http://tempuri.org/AddressBookService" use="encoded"/>
            </output>
        </operation>
        <operation name="getAddressFromName">
            <soap:operation soapAction="http://tempuri.org/AddressBookService"/>
            <input>
                <soap:body encodingStyle="http://schemas.xmlsoap.org/soap/encoding/"
                    namespace="http://tempuri.org/AddressBookService" use="encoded"/>
            </input>
            <output>
                <soap:body encodingStyle="http://schemas.xmlsoap.org/soap/encoding/"
                    namespace="http://tempuri.org/AddressBookService" use="encoded"/>
            </output>
        </operation>
        <operation name="removeEntry">
            <soap:operation soapAction="http://tempuri.org/AddressBookService"/>
            <input>
                <soap:body encodingStyle="http://schemas.xmlsoap.org/soap/encoding/"
                    namespace="http://tempuri.org/AddressBookService" use="encoded"/>
            </input>
            <output>
                <soap:body encodingStyle="http://schemas.xmlsoap.org/soap/encoding/"
                    namespace="http://tempuri.org/AddressBookService" use="encoded"/>
            </output>
        </operation>
    </binding>
    <service name="SimpleAddressBookService">
        <port binding="AddressBook_ServiceBinding" name="Demo">
            <soap:address
 location="http://localhost:80/wstk/addressbook/services/SimpleAddressBookService"/>
        </port>
    </service>
</definitions>
```

*FIG. 14C*

WSDL for AddressBook (with Java binding)

```xml
<?xml version="1.0" encoding=UTF-8"?>
<definitions xmlns="http://schemas.xmlsoap.org/wsdl/"
name="SimpleAddressBookService"
targetNamespace="http://tempuri.org/AddressBookService"
xmlns:xmlns="http://schemas.xmlsoap.org/wsdl/"
xmlns:AddressBook="http://tempuri.org/AddressBookService-types"
xmlns:format="http://schemas.xmlsoap.org/wsdl/formatbinding/"
xmlns:interface="http://tempuri.org/AddressBookService-interface"
xmlns:java="http://schemas.xmlsoap.org/wsdl/java/"
xmlns:soap="http://schemas.xmlsoap.org/wsdl/soap/"
xmlns:tns="http://tempuri.org/AddressBookService"
xmlns:types="http://tempuri.org/AddressBookService-types"
xmlns:xsd="http://www.w3.org/2001/XMLSchema">
<types>
    <schema xmlns="http://www.w3.org/2001/XMLSchema"
        targetNamespace="http://tempuri.org/AddressBookService-types"
        xmlns:xmlns="http://www.w3.org/2001/XMLSchema"
        xmlns:AddressBook="http://tempuri.org/AddressBookService-types">
            <complexType
                name="AddressType">
                <sequence maxOccurs="1" minOccurs="1">
                    <element maxOccurs="1" minOccurs="1" name="streetNum" type="xsd:int"/>
                    <element maxOccurs="1" minOccurs="1" name="streetName" type="xsd:string"/>
                    <element maxOccurs="1" minOccurs="1" name="city" type="xsd:string"/>
                    <element maxOccurs="1" minOccurs="1" name="state" type="xsd:string"/>
                    <element maxOccurs="1" minOccurs="1" name="zip" type="xsd:int"/>
                    <element maxOccurs="1" minOccurs="1" name="phoneNumber" type="AddressBook:phoneNumberType
                </sequence>
            </complexType>
            <complexType
                name="phoneNumberType">
                <sequence maxOccurs="1" minOccurs="1">
                    <element maxOccurs="1" minOccurs"1" name="areaCode" type="xsd:int"/>
                    <element maxOccurs="1" minOccurs="1" name="exchange" type="xsd:string"/>
                    <element maxOccurs="1" minOccurs="1" name="number" type="xsd:string"/>
                </sequence>
            </complexType>
        </schema>
</types>
<message name="InaddEntryRequest">
    <part name="meth1_inType1" type="xsd:string"/>
    <part name="meth1_inType2" type="types:AddressType"/>
</message>
<message name="InremoveEntryRequest">
    <part name="meth1_inType1" type="xsd:string"/>
</message>
<message name="voidResponse">
</message>
```

FIG. 15A

```xml
<message name="IngetAddressFromNameRequest">
    <part name="meth2_inType1" type="xsd:string"/>
</message>
<message name="OutremoveEntryResponse">
    <part name="removeEntryResult" type="xsd:string"/>
</message>
<message name="OutgetAddressFromNameResponse">
    <part name="getAddressFromNameResult" type="types:AddressType"/>
</message>
<portType name="AddressBook_Service">
    <operation name="addEntry">
        <input message="tns:InaddEntryRequest"/>
        <output message="tns:voidResponse"/>
    </operation>
    <operation name="getAddressFromName">
        <input message="tns:IngetAddressFromNameRequest"/>
        <output message="tns:outgetAddressFromNameResponse"/>
    </operation>
    <operation name="removeEntry>
        <input message="tns:InremoveEntryRequest"/>
        <outputmessage="tns:OutremoveEntryResponse"/>
    </operation>
</portType>
<binding name="JavaBinding"
    type="tns:AddressBook_Service">
        <java:binding xmlns="http://schemas.xmlsoap.org/wsdl/java/" />
            <format:typeMapping xmlns="http://schemas.xmlsoap.org/wsdl/formatbinding/"
                encoding="Java" style="Java">
                <format:typeMap formatType="demo.PhoneNumber" typeName="types:phoneNumberType"/>
                <format:typeMap formatType="demo.Address" typeName="types:AddressType"/>
                <format:typeMap formatType="int" typeName="xsd:int"/>
                <format:typeMap formatType="java.lang.String" typeName="xsd:string"/>
            </format:typeMapping>
```

*FIG. 15B*

```
<operation name="addEntry">
  <java:operation xmlns="http://schemas.xmlsoap.org/wsdl/java/"
      methodName="addEntry" methodType="instance"/>
</operation>
<operation name="getAddressFromName">
  <java:operation xmlns="http://schemas.xmlsoap.org/wsdl/java/"
      methodName="getAddressFromName" methodType="instance"/>
</operation>
<operation name="removeEntry">
  <java:operation xmlns="http://schemas.xmlsoap.org/wsdl/java/"
      methodName="removeEntry" methodType="instance"/>
</operation>
</binding>
<service name="SimpleAddressBookService">
  <port binding="tns:JavaBinding" name="JavaPort">
    <java:address xmlns="http://schemas.xmlsoap.org/wsdl/java/" className="demo.AddressBook"/>
  </port>
</service>
</definitions>
```

*FIG. 15C*

FLEXIBLE WEB SERVICE DEPLOYMENT

CROSS-REFERENCE TO RELATED APPLICATION

This application is a continuation of application Ser. No. 10/322,051, filed Dec. 17, 2002, issued as U.S. Pat. No. 7,284,039 issued Oct. 16, 2007.

RELATED APPLICATIONS

The present invention is related to similar subject matter of commonly assigned U.S. patent application Ser. No. 10/314,813 entitled "Dynamic Web Service Implementation Discovery and Selection Apparatus and Method," filed on Dec. 9, 2002, abandoned and U.S. patent application Ser. No. 10/322,053 entitled "Apparatus and Method for Selecting a Web Service in Response to a Request from a Client Device," filed on Dec. 17, 2002, issued as U.S. Pat. No. 7,188,155, both of which are hereby incorporated by reference.

BACKGROUND OF THE INVENTION

1. Technical Field

The present invention is directed to an apparatus and method of flexible web service deployment. More specifically, the present invention is directed to an apparatus and method for deploying a web service using a web services description language document, a Java bean, or both.

2. Description of Related Art

In service-oriented architectures, the fundamental premise is the reuse of web services across one or more enterprise applications. Web services are services that are offered across the Internet that are built using standard technologies that allow interoperability between systems and applications. Web services are typically invoked by enterprise applications to perform some extended functionality not otherwise available in the enterprise application itself. The enterprise applications and their associated enterprise systems are often referred to as "clients" of the web services that they invoke.

Web services are described using a standard language called the Web Services Description Language (WSDL). Co-developed by Microsoft and IBM, WSDL describes the protocols and data types used by the web service. WSDL descriptions can be referenced in a Universal Description, Discovery and Integration (UDDI) registry in order to promote the use of Web services worldwide. Typically, a web service provider publishes information about its web service in a UDDI registry; that information points to the WSDL description of the web service. A client that wants to use the web service obtains the WSDL from a UDDI registry or perhaps other sources. Using the information in the WSDL document, the client can access the web service.

Both the web service provider and the web service client require a "web services infrastructure." The provider infrastructure must know about the web services it is to provide. Thus, web services must be "deployed" in such provider infrastructures. There are several examples of provider infrastructures including Apache SOAP, Apache Axis, or the IBM Web Services Gateway. These infrastructures differ in the requirements for deploying web services, however. Apache infrastructures support deployment simply by naming the "local" implementation, i.e., on the same node, (in Java, the class name), because the implementation is always local. The Gateway, however, requires that any implementation be described using WSDL, because the Gateway supports implementations that can be local (for example a Java class) or remote, i.e., a web service running on a different node, such that the Gateway is acting as a proxy or intermediary.

A web service implementation may require complex data types as parameters or return values. For convenience, these data types are implemented as structures, as in the C language, or classes, as in object-oriented languages such as Java. WSDL supports the description of data types of arbitrary complexity. A WSDL description, as an XML document, uses namespace-qualified names (qname) to identify data types and other entities described in the WSDL document. The data type qnames must be used in the SOAP messages that flow between a web service and a client of that web service to identify instances of parameter and return value types.

When a web service provider deploys a web service into its web service infrastructure, such as Apache SOAP, or Apache Axis, the provider must tell the infrastructure how to match the data types in the SOAP message with the actual implementation of the data type used by the web service implementation. Similarly, a web service client that wishes to use implementations of data types must also tell its infrastructure how to match the data types in the SOAP message with the actual implementation of the data type used by the client. This is accomplished in both infrastructures by defining a mapping to the infrastructure. The mapping relates a qname to a structure or class name. The actual data type implementations may or may not be the same, and typically they will not be the same.

Since the data type qname information in the WSDL document used by the client is generated by the provider of the web service, there is a guaranteed match. That is, the client must include the namespace information for data types from the WSDL document produced by the web service provider in the messages it sends to the web service, so that the web service provider understands how to match the data.

Thus, some known systems require that all web services, either remote or local, be described using WSDL. Other known systems allow local services to be described using only a name of the implementing class, i.e. described as JavaBeans. There is no known system that facilitates the use of both WSDL document descriptions for remote and local web services and/or local description of web services as JavaBeans.

SUMMARY OF THE INVENTION

In view of the above, it is desirable to have an improved infrastructure that permits both remote web service implementations and local web service implementations and to make both implementations available to a client. However, typically local web service implementations do not have WSDL documents established for them. In addition, to be competitive with known infrastructures, such as Apache infrastructures, it is desirable, and much more convenient, to allow deployment of local implementations simply by identifying the name of the local implementation, such as a Java class, rather than for development of a WSDL document for the local web service implementation.

In addition, it is also important to support redeployment of local web services formerly offered by other infrastructures and described by existing WSDL documents. Older infrastructures use qnames, in particular the namespace component of the qnames, that are unique to that infrastructure. Clients of web services deployed in those infrastructures use the qnames from the original WSDL, and so those qnames must be maintained in any new WSDL generated. This allows existing clients to access web services deployed in the improved infrastructure by changing only the endpoint information in the client. This can be achieved by supplying the original WSDL when deploying local web service implementation in the improved infrastructure.

The present invention provides an apparatus and method for deploying web services in an improved web services infrastructure, the web services bus, such that the web services may be deployed using either local JavaBean representations of the web service and/or web service description language representations of the web service. With the apparatus and method, a deployment descriptor for a web service is retrieved from a configuration file. A location type in the deployment descriptor is provided for identifying whether the web service is implemented using a web services description language (WSDL) document only, a JavaBean only, or both a WSDL document and a JavaBean.

Based on the location type, and associated attributes of the location type, processes are performed for generating an internal definition of the web service to thereby deploy the web service in the web services infrastructure. The internal definition may be generated from the WSDL document directly, if the location type is WSDL only. If the location type is JavaBean only, the internal definition may be generated by first generating a WSDL document from the JavaBean and then generating the internal definition from the generated WSDL document. If the location type is both a WSDL document and JavaBean, then the internal definition is generated from the WSDL document with a Java binding being added to reference the JavaBean.

The present invention provides the ability to use both WSDL and a JavaBean. This allows client devices to continue to use the type name information in the existing WSDL, yet invoke services using the bus supporting a JavaBean as the real implementation. The present invention allows this by creating a description of the service using type name information from the existing WSDL mapped to the actual Java types used by the JavaBean. This requires the client to change only the actual endpoint information for the service to invoke the JavaBean deployed in the bus infrastructure instead of the original environment from which the existing WSDL was derived.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram illustrating a configuration file format in accordance with the present invention;

FIG. 9 is a flowchart outlining an exemplary operation of the present invention when generating a Java binding for a service definition of a web service implementation;

FIG. 10 is an example signature of an AddressBook JavaBean used to illustrate the results of the present invention;

FIG. 11A is an example of an Address JavaBean used as a parameter by the AddressBook JavaBean of FIG. 10;

FIG. 11B is an example of a PhoneNumber JavaBean used as a field in the Address JavaBean of FIG. 11A;

FIGS. 12A-12C illustrate an example WSDL document generated for the AddressBook JavaBean using JAVA2WSDL according to the processes of the present invention for web services that are described only as a JavaBean;

FIGS. 13A-13C illustrate the internal service description of FIGS. 12A-12C after a Java binding has been added to it;

FIGS. 14A-14C illustrate an original WSDL description derived from the AddressBook JavaBean of FIG. 11A according to the processes of the present invention for web services that are described by both a WSDL document and a JavaBean; and FIGS. 15A-15C illustrate the WSDL description of FIGS. 14A-14C after a Java binding has been added to it.

DETAILED DESCRIPTION OF THE PREFERRED EMBODIMENT

As previously mentioned, the present invention is directed to apparatus and method of flexible web service deployment. More specifically, the present invention is directed to an apparatus and method for deploying a web service using a web services description language document, a Java bean, or both.

Figure 1:
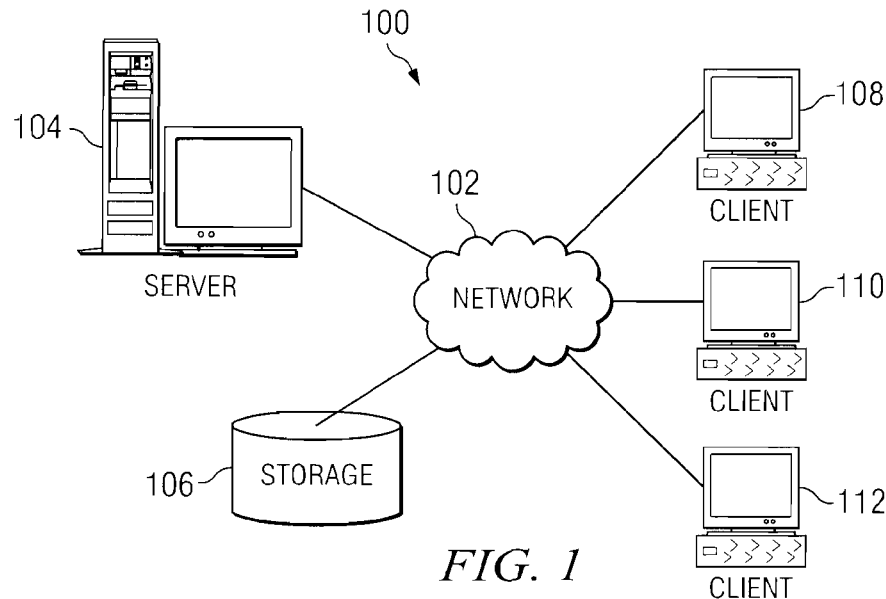
FIG. 1 is an exemplary block diagram of a distributed data processing system in which the present invention may be implemented.
Figure 2:
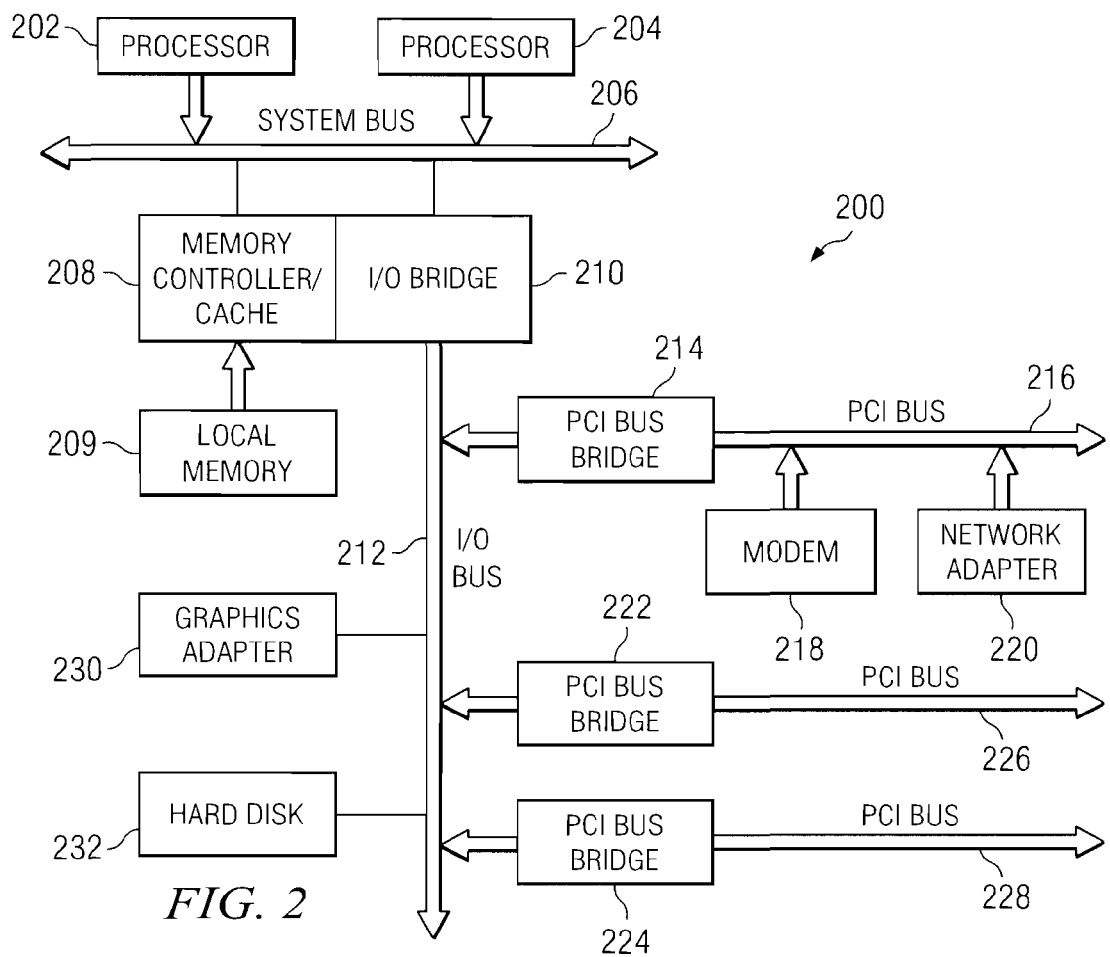
FIG. 2 is an exemplary diagram of a server computing device with which the present invention may operate.
Figure 3:
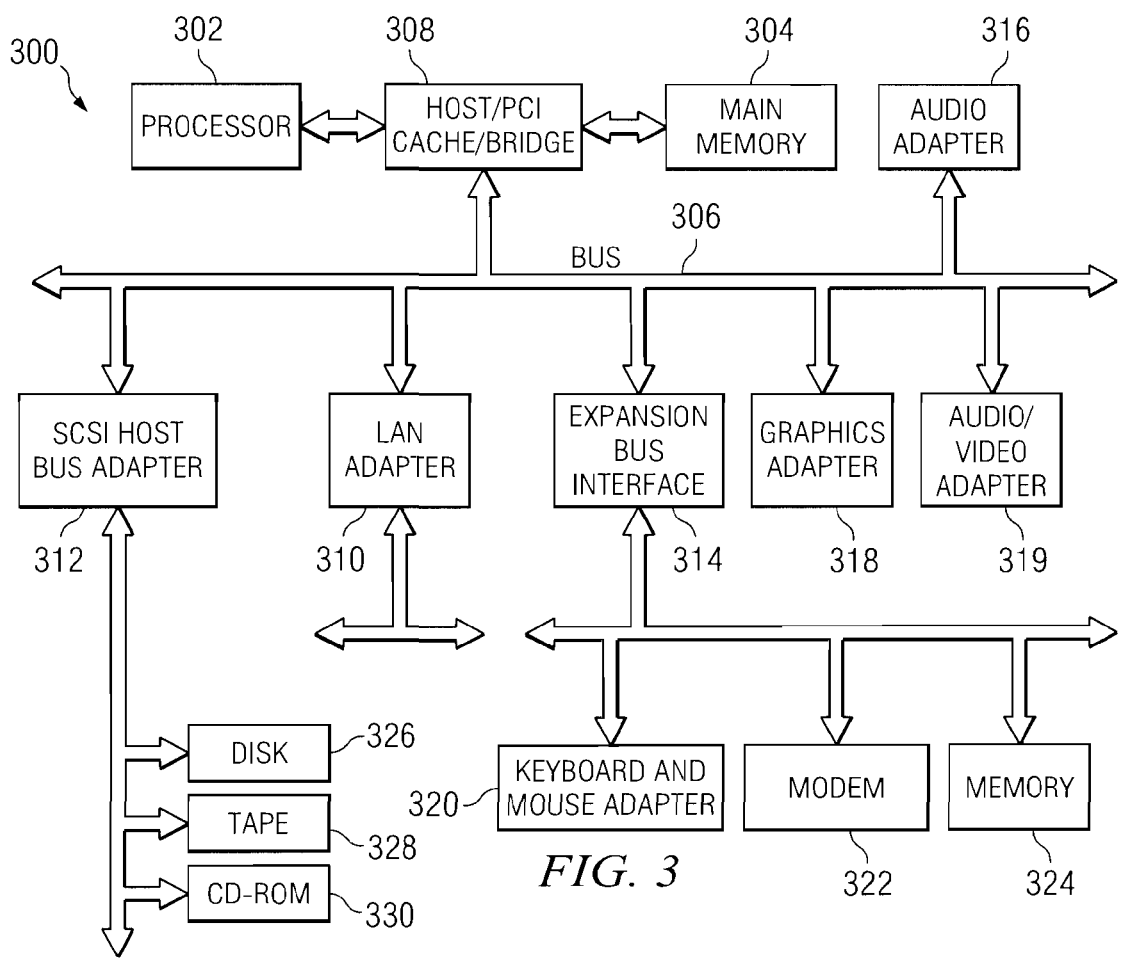
FIG. 3 is an exemplary diagram of a client computing device in which the present invention may be implemented.

It is prudent to first provide a brief description of the environment in which the present invention may operate. Thus, FIGS. 1-3 provide exemplary diagrams of the computing network and computing devices in which the present invention operates. FIGS. 1-3 are exemplary and are intended to provide a context for the remaining description.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212 Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides an improved infrastructure that permits both remote web service implementations and local web service implementations and to make both implementations available to a client. The improved infrastructure of the present invention is implemented in a web services bus. Various aspects of the web services bus are described in the incorporated U.S. patent application Ser. No. 10/314,813 entitled "Dynamic Web Service Implementation Discovery and Selection Apparatus and Method," and U.S. patent application Ser. No. 10/322,053 entitled "Apparatus and Method for Selecting a Web Service in Response to a Request from a Client Device." A brief overview of the improved infrastructure as well as a description of the implementation of the present invention in this improved infrastructure will now be provided.

Figure 4:
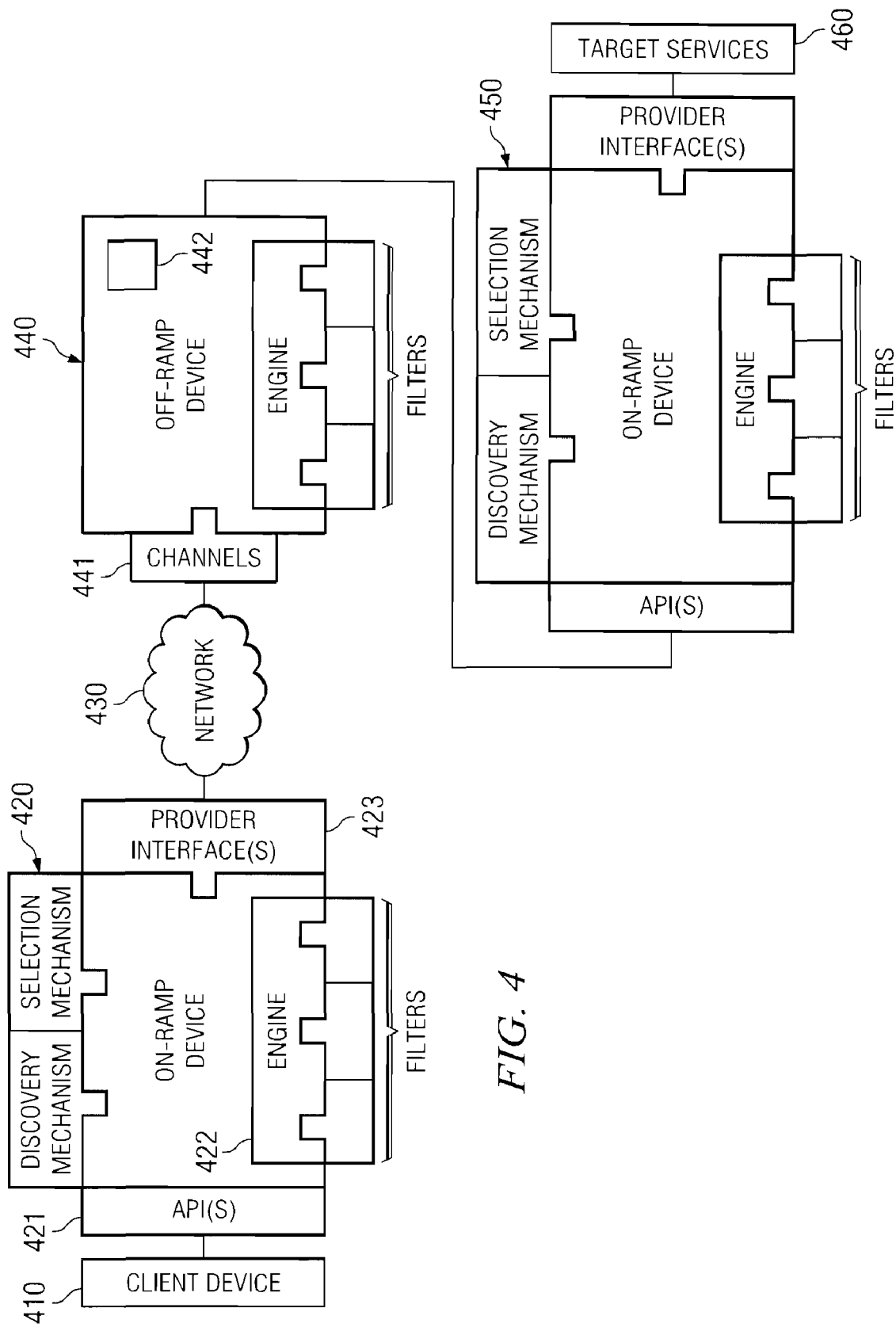
FIG. 4 is an exemplary diagram illustrating a web services "bus" according to the present invention.

FIG. 4 is an exemplary diagram illustrating a web services "bus" according to the present invention. With the present invention, on a client side of the system, a client device 410 is coupled to a network 430 via an extended web services infrastructure on-ramp device 420. On a server side of the system, requests from client devices are received over the network 430 via the off-ramp device 440. Target services 460 are accessed through the on-ramp device 450 which is used to perform discovery and selection of target service implementations based on the service portType implied by of the request from the client device 410. Web services implementations are described to the on-ramp device 450, i.e. deployed by adding their descriptions to the configuration file 442, as WSDL documents.

With the present invention, the client device 510 includes one or more applications running on the client device 410. These applications interface with the on-ramp device 420 via the application program interfaces (APIs) 421 that take the operations performed by the application requiring a web service and provide operation information to the engine 422 of the on-ramp device 420 which generates a request for a web service operation using WSDL service descriptions. The web service operation request is then sent to the off-ramp 440 via the provider interface(s) 423, network 430 and channels 441.

The off-ramp device 440 receives the request for a web service operation from the on-ramp device 420 and checks a configuration file 442 to determine if the requested web service identified in the WSDL service definition of the request is recognized by the off-ramp device 440. The configuration file 442 contains a listing of the web services that are supported by the off-ramp device 440. Web services must be deployed in the off-ramp 440, i.e., their descriptions must be added to the configuration file 442, before they can be recognized by the off-ramp 440 and used to satisfy web service operation requests from client devices. As will be discussed in greater detail hereafter, web services may be deployed with the off-ramp as either web services whose implementation is defined by a WSDL document, web services whose implementation is a JavaBean, or web services whose implementation is a JavaBean and is also described in a WSDL document.

Web services are identified in the configuration file 442 by their serviceName. In order to determine if the requested web service is known to the off-ramp 440, a determination is made as to whether the serviceName identified in the request for a web service operation is found in the configuration file 442. If the serviceName specified is not in the configuration file 442, the off-ramp returns a fault to the client.

As shown in FIG. 5, the serviceName in the configuration file 442 has an associated deployment description that provides a recognizable description of how the web service may be deployed in the web services infrastructure. The deployment descriptor contains a location type 510 attribute and additional attributes 520 dependent on the value of the location type attribute. The location type 510 identifies whether the real implementation of the web service supporting the corresponding portType is described using WSDL only, implemented as a JavaBean, or both. The additional attributes 520 provide additional information necessary to make use of a specific implementation of the web service. FIG. 5 illustrates the three possible location types and their corresponding additional attributes in accordance with the present invention.

As shown in FIG. 5, a first location type 530 may be a WSDL only location type, e.g., "URL" location type. The attributes 532 for a WSDL only location type include an identifier of the location of a WSDL document that describes the web service implementation. The WSDL only location type is typically used to describe remotely located web services that are accessible via a remote access protocol, such as SOAP/HTTP.

A second location type 540 for a web service implementation is a JavaBean location type. The attributes 542 for a JavaBean location type include a name of the class of the real implementation of the web service and a namespace used in a WSDL-based description that is automatically generated by the present invention to describe the web service implementation. The JavaBean location type is typically used to deploy local web services.

The third location type 550 for a web service implementation is a "both" location type indicating that the web service is implemented as a JavaBean but is also described in a WSDL document generated by another web service provider infrastructure. The attributes 552 for a location type indicating both WSDL and JavaBean implementations include a location attribute identifying a location of a WSDL document describing the original web service implementation and a class name identifying the name of a class of the real implementation of the web service.

The description of the web services in the configuration file 442 may be generated by a human administrator or by an automatic mechanism. For example, when a new web service is to be added to the web services supported by the off-ramp 540, a registration process, such as providing a web service that can modify the configuration file, may be used to identify the type of web service implementation, its location, class name, service namespace, and the like. This information may then be formatted and stored in the configuration file 442 for later use in accessing the new service implementation.

In order for the web service implementation to be accessible via the off-ramp 440, an internal definition of the web service implementation must be generated and stored in memory. This internal definition allows the off-ramp to quickly access the information needed to invoke the web service implementation upon a request from a client. In order to generate an internal definition for a web service implementation, the off-ramp examines the location type 510 defined in the deployment descriptor of the web service in the configuration file 442. If the location type indicates that the web service is only described in a WSDL document, the off-ramp 440 loads the WSDL document indicated in the location attribute 520 and uses a toolkit, such as Web Services Description Language for Java (WSDL4J), to convert the WSDL document into an internal definition of the web service implementation. WSDL4J is a known Java toolkit that allows the creation, representation, and manipulation of WSDL documents describing services. Information about WSDL4J may be obtained, for example, from www-124.ibm.com/developerworks/projects/wsdl4j/.

If the location type indicates that the web service is implemented only as a JavaBean, an application for converting from Java to WSDL, such as JAVA2WSDL from the Apache Axis project, is used to first create a WSDL document with a SOAP/HTTP binding and corresponding port in a service. From the WSDL document, a WSDL4J definition is created so that the description can be manipulated. Thereafter, a Java binding is added to the definition. Alternatively, other types of applications, such as WebSphere Studio Application Developer version 5, may be used to create the required Java binding direction from the JavaBean. Both JAVA2WSDL and WebSphere Studio Application Developer version 5 are known applications and information about them may be obtained, for example, from www.systinet.com/doc/wasp- _jserver/tools/java2WSDL.html and www-3.ibm.com/software/ad/studioappdev/, respectively.

If the location type of the web service indicates that it is both implemented as a JavaBean and described in a WSDL document from another web services provider infrastructure, an internal definition of the web service is generated from the WSDL document, using for example, the WSDL4J toolkit noted earlier, and a Java binding is added to the internal definition, with as much information as possible from the original WSDL document being retained, in particular namespaces.

With the present invention, if the off-ramp 440 consults the configuration file 442 and determines that the requested service corresponds to a web service that has a deployment descriptor indicating the web services is only described as a WSDL document, and the WSDL document contains a "remote" protocol binding, for example a SOAP/HTTP binding, the off-ramp 440 acts as an intermediary between the client device and the real implementation of the web service. As an intermediary, the off-ramp passes requests to, and receives responses from, the real implementation of the web service at the endpoint identified in the WSDL document.

If the WSDL document contains a "local" protocol binding, for example, a Java binding, the off-ramp 440 acts as an endpoint by directly invoking the JavaBean class identified by the WSDL document. Likewise, if the configuration file 442 indicates that the requested service corresponds to a web service whose real implementation is a JavaBean, the off-ramp 440 directly invokes the JavaBean described in the attributes set forth in the configuration file 442. If the configuration file 442 indicates that the requested service corresponds to a web service whose real implementation is described by a WSDL document and implemented by a JavaBean, the off-ramp 440 directly invokes the JavaBean described in the attributes set forth in the configuration file.

Figure 6:
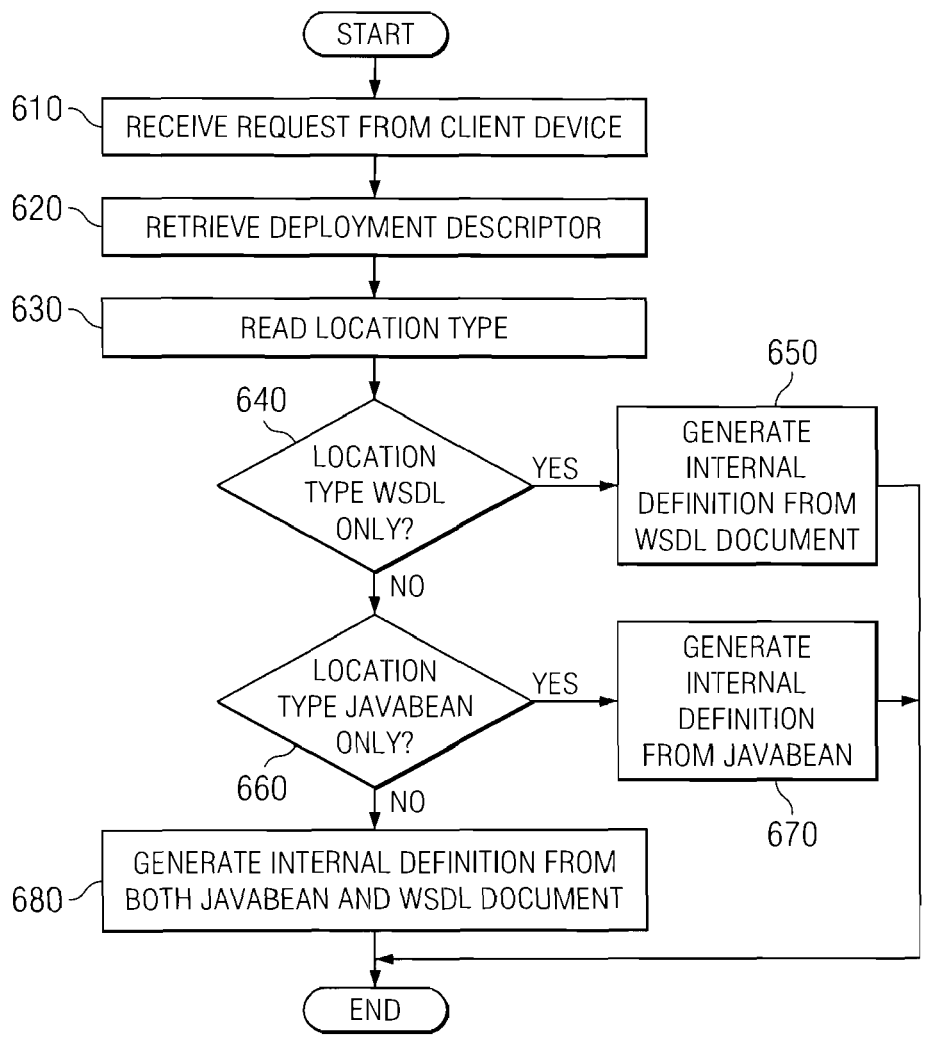
FIG. 6 is flowchart outlining an exemplary operation of the present invention when generating an internal service definition for a web service implementation.

FIG. 6 is a flowchart outlining an exemplary operation of the present invention when generating an internal service definition for a web service implementation. As shown in FIG. 6, the operation starts by receiving a request for a web services operation from a client device (step 610). A deployment descriptor corresponding to the web service in the request received from the client device is then retrieved from the configuration file, or in memory version of the configuration file (step 620). The location type in the deployment descriptor is then read (step 630) and a determination is made as to whether the location type is a WSDL only location type (step 640). If so, the internal definition of the web service implementation is generated from the WSDL document specified in the location type attributes (step 650). This may be done, for example, by using the WSDL4J toolkit previously discussed.

If the location type is not WSDL only, then a determination is made as to whether the location type is JavaBean only (step 660). If the location type is JavaBean only, the internal definition of the web services implementation is generated from the JavaBean (step 670). This may be done, for example, by using the JAVA2WSDL or WebSphere Studio Application Developer application previously discussed. The details of step 670 are shown in FIG. 7, described hereafter.

Figure 8:
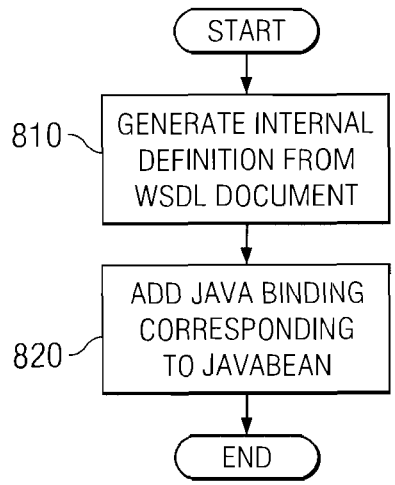
FIG. 8 is a flowchart outlining an exemplary operation of the present invention when generating an internal service definition for a JavaBean and WSDL web service implementation.

If the location type is neither WSDL only nor JavaBean only, then the location type, in a preferred embodiment of the present invention, must be "both," indicating that the web service implementation is described in a WSDL document and implemented as a JavaBean. If the location type is "both", the internal definition of the web service implementation is generated from both the JavaBean and the WSDL document (step 680). The details of step 680 are shown in FIG. 8, discussed hereafter.

It should be noted that, in some implementations of the present invention, there may be additional location types in addition to, or in replacement of, the WSDL only, JavaBean only, and both location types described herein. In such implementations, additional checks of location type may be required in addition to, or in replacement of, the decision steps described in FIG. 7.

Figure 7:
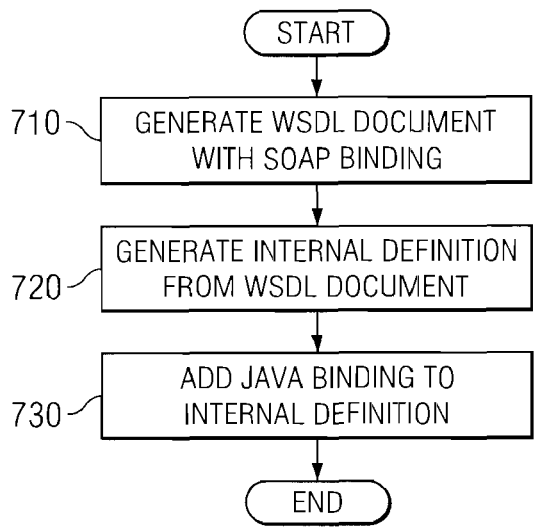
FIG. 7 is a flowchart outlining an exemplary operation of the present invention when generating an internal service definition for a JavaBean only web service implementation.

FIG. 7 is a flowchart outlining an exemplary operation of the present invention when generating an internal service definition for a JavaBean only web service implementation. As shown in FIG. 7, the operation starts by generating a WSDL document with a SOAP binding (step 710). This may be done, for example, using the JAVA2WSDL or WebSphere Studio Application Developer application previously discussed. Thus, the result of step 710 is a WSDL document describing the web service implementation.

From this WSDL document, an internal definition of the web service implementation is generated (step 720). This may be done, for example, using the WSDL4J toolkit discussed earlier. After the internal definition of the web service implementation is generated, a Java binding is added to the internal definition (step 730). The process of adding a Java binding to an internal definition of a web service implementation is illustrated in FIG. 9, described herein below.

FIG. 8 is a flowchart outlining an exemplary operation of the present invention when generating an internal service definition for a JavaBean and WSDL document. As shown in FIG. 8, the operation starts with generating an internal definition for the web service implementation from the WSDL document (step 810). A Java binding corresponding to the JavaBean for this web service implementation is then added to the internal definition of the web service implementation (step 820) using the class name specified in the location type attributes of the deployment descriptor for this web service implementation.

FIG. 9 is a flowchart outlining an exemplary operation of the present invention when generating a Java binding for a service definition of a web service implementation. As shown in FIG. 9, the operation starts by introspection of the target JavaBean (step 910). Introspection allows an understanding of the methods of the JavaBean (the operations provided by the web service) and the data types used by the JavaBean as parameters and return values. The data types used by the target JavaBean are then mapped to the data types defined in the internal definition of the web service implementation from the WSDL definition (step 920).

The namespaces for Java extensibility elements are then added to the internal definition (step 930). Thereafter, the existing binding and service elements in the internal definition are removed (step 940). For example, a WSDL document is created from a JavaBean using JAVA2WSDL, a SOAP binding is added to the WSDL document. This SOAP binding is removed during step 940 so that the internal definition of the web service implementation includes only the Java binding being created.

The Java binding is then added to the internal definition (step 950). This may include adding extensibility elements for mapping to the data types used. Thereafter, a new WSDL service element with a port that references the Java binding is added (step 960).

The results of the use of the present invention are illustrated in the examples shown in FIGS. 10 through 15C. FIG. 10 is an example signature of an AddressBook JavaBean used to illustrate the results of the present invention. FIG. 11A is an example of an Address JavaBean used as a parameter by the AddressBook JavaBean of FIG. 10. FIG. 11B is an example of a PhoneNumber JavaBean used as a field in the Address JavaBean of FIG. 11A. FIGS. 12A-12C and 13A-13C illustrate the results of deploying AddressBook as a local web service implementation with the location type of "bean." FIGS. 14A-14C and 15A-15C illustrate the results of deploying an AddressBook JavaBean as a local web service implementation with the location type of "both."

FIGS. 12A-12C illustrate an example WSDL document generated for the AddressBook JavaBean using JAVA2WSDL according to the processes of the present invention for web services that are described as a JavaBean. In FIGS. 12A-12C, the SOAP/HTTP information in the binding cannot be used to access the web service since the intent is to run the AddressBook JavaBean locally. The WSDL based internal description shown in FIGS. 12A-12C may be generated as a result of, for example, step 770 and/or step 810.

FIGS. 13A-13C illustrate the internal service description of FIGS. 12A-12C after a Java binding has been added to it. It should be noted that the "Java" and "format" namespaces have been added to support the Java binding. The internal description shown in FIGS. 13A-13C may be generated as a result of, for example, step 830.

FIGS. 14A-14C illustrate an original WSDL definition derived from the AddressBook JavaBean of FIG. 11A as might be generated from a different web service provider infrastructure such as Apache Axis. As shown in FIGS. 14A-14C, the WSDL definition includes a SOAP/HTTP binding with a port that has a real endpoint address.

FIGS. 15A-15C illustrate the WSDL definition of FIGS. 14A-14C after a Java binding has been added to it. It should be noted that the Java binding has mappings between the data types defined in the original WSDL definition and the Java classes that represent those types for the web service. This allows the client to use the original WSDL for type mapping, yet allow the web service to use classes known to it to represent those data types.

During the deployment of a web service in the web services bus infrastructure, any type mappings in a binding are described to the bus channel that handles serialization and deserialization. Any incoming requests have the parameters, with data types named according to the internal definition of the service, mapped to the correct JavaBean classes. The reverse takes place for outgoing responses. With the present invention, such operations may be performed whether the target web service implementation is initially described with WSDL or not.

In addition, since the present invention allows the creation of internal definitions to describe all service implementations either local or remote, the present invention allows consistent use of the bus on-ramp to invoke the actual service implementation. Moreover, the ability to use both WSDL and a JavaBean allows client devices to continue to use the data type name information in the existing WSDL, yet invoke services using the bus supporting a JavaBean as the real implementation. The present invention allows this by creating a description of the service using type name information from the existing WSDL mapped to the actual Java types used by the JavaBean. This requires the client to change only the actual endpoint information for the service to invoke the JavaBean deployed in the bus environment instead of the original environment from which the existing WSDL was derived.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for deploying a web service, comprising:
   retrieving a deployment descriptor for the web service;
   determining, by a processor unit, a location type for the web service from the deployment descriptor, wherein the location type identifies whether a description of a real implementation of the web service supporting a portType comprises at least one of WSDL and JavaBean; and
   responsive to a determination that the location type for the web service indicates that the web service is defined by both a JavaBean and a web service description language document, deploying the web service based on the location type for the web service, wherein the deployment descriptor describes how the web service is deployed in the data processing system.

2. The method of claim 1, wherein deploying the web service based on the location type for the web service includes generating an internal definition of the web service using location type attributes associated with the location type.

3. The method of claim 1, wherein if the location type is determined to indicate that the web service is defined by a JavaBean, deploying the web service includes:
   generating a web service description language (WSDL) document for the web service based on the JavaBean; and
   generating an internal definition of the web service based on the WSDL document.

4. The method of claim 3, wherein deploying the web service further includes adding a Java binding to the internal definition of the web service.

5. The method of claim 1, wherein if the location type is determined to indicate that the web service is defined by a web services description language (WSDL) document only, deploying the web service includes:
   generating an internal definition of the web service based on the WSDL document.

6. A computer program product in a computer recordable medium for deploying a web service, comprising:
   first instructions for retrieving a deployment descriptor for the web service;
   second instructions for determining a location type for the web service from the deployment descriptor, wherein the location type identifies whether a description of a real implementation of the web service supporting a portType comprises at least one of WSDL and JavaBean; and third instructions for deploying the web service based on the location type for the web service responsive to a determination that the location type for the web service indicates that the web service is defined by both a JavaBean and a web service description language document, wherein the deployment descriptor describes how the web service is deployed in the data processing system.

7. The computer program product of claim 6, wherein the third instructions for deploying the web service based on the location type for the web service include instructions for generating an internal definition of the web service using location type attributes associated with the location type.

8. The computer program product of claim 6, wherein for the location type being determined to indicate that the web service is defined by a JavaBean, the third instructions for deploying the web service include:
  instructions for generating a web service description language (WSDL) document for the web service based on the JavaBean; and
  instructions for generating an internal definition of the web service based on the WSDL document.

9. The computer program product of claim 8, wherein the third instructions for deploying the web service further include instructions for adding a Java binding to the internal definition of the web service.

10. The computer program product of claim 6, wherein for the location type being determined to indicate that the web service is defined by a web services description language (WSDL) document only, the third instructions for deploying the web service include:
  instructions for generating an internal definition of the web service based on the WSDL document.

11. A web services bus off-ramp, comprising:
  means for retrieving a deployment descriptor for a web service;
  means for determining, using a processor unit, a location type for the web service from the deployment descriptor, wherein the location type identifies whether a description of a real implementation of the web service supporting a portType comprises at least one of WSDL and JavaBean; and
  means for deploying the web service based on the location type for the web service, wherein the deployment descriptor describes how the web service is deployed in the data processing system responsive to a determination that the location type for the web service indicates that the web service is defined by both a JavaBean and a web service description language document.

12. The web services bus off-ramp of claim 11, wherein deploying the web service based on the location type for the web service includes generating an internal definition of the web service using location type attributes associated with the location type.

13. The web services bus off-ramp of claim 11, wherein if the location type is determined to indicate that the web service is defined by a JavaBean, deploying the web service includes:
  generating a web service description language (WSDL) document for the web service based on the JavaBean; and
  generating an internal definition of the web service based on the WSDL document.

14. The web services bus off-ramp of claim 13, wherein deploying the web service further includes adding a Java binding to the internal definition of the web service.

15. The web services bus off-ramp of claim 11, wherein if the location type is determined to indicate that the web service is defined by a web services description language (WSDL) document only, deploying the web service includes:
  generating an internal definition of the web service based on the WSDL document.

\* \* \* \* \*